United States Patent [19]
Dietterle

[11] Patent Number: 5,195,926
[45] Date of Patent: Mar. 23, 1993

[54] FLAP ARRANGEMENT

[75] Inventor: Thomas Dietterle, Simmozheim, Fed. Rep. of Germany

[73] Assignee: Mercedes-Benz AG, Fed. Rep. of Germany

[21] Appl. No.: 682,317

[22] Filed: Apr. 9, 1991

[30] Foreign Application Priority Data

Apr. 14, 1990 [DE] Fed. Rep. of Germany ....... 4012215

[51] Int. Cl.$^5$ .............................................. B60H 1/24
[52] U.S. Cl. ................................... 454/143; 137/595; 137/862
[58] Field of Search .................... 137/595, 862, 601; 454/69, 143, 156, 159, 160, 326, 336

[56] References Cited

U.S. PATENT DOCUMENTS

| | | | |
|---|---|---|---|
| 3,017,894 | 1/1962 | Goldsmith et al. | 454/326 X |
| 3,044,387 | 7/1962 | Hinden | 137/601 X |
| 3,084,715 | 4/1963 | Scharres | 454/336 X |
| 4,191,212 | 3/1980 | Hagar | 137/601 |
| 4,241,647 | 12/1980 | Herr | 454/336 |

FOREIGN PATENT DOCUMENTS 3813116 10/1989 Fed. Rep. of Germany.

Primary Examiner—Harold Joyce
Attorney, Agent, or Firm—Evenson, Wands, Edwards, Lenahan & McKeown

[57] ABSTRACT

A flap arrangement, especially for a ventilation or air-conditioning system or vehicles, has two flaps which are pivotable about pivot axes parallel to one another and which are coupled to one another for the oppositely directed pivoting movement. The coupling is made via a coupling rod articulated on the two flaps. To achieve a pivoting angle of the same amount on both flaps, the articulation points are so determined that, on the one hand, the radius of the circular paths described by them during the pivoting of the flaps is of equal size and, on the other hand, during the pivoting of the flaps, an imaginary effective straight line respectively connecting the two articulation points rotates about an imaginary center of rotation located approximately in the middle between the two pivot axes.

9 Claims, 3 Drawing Sheets

FLAP ARRANGEMENT

BACKGROUND AND SUMMARY OF THE INVENTION

The invention relates to a flap arrangement, especially for a ventilation or air conditioning system for vehicles. More particularly, the present invention relates to a flap arrangement in which the articulation points on the flaps are so determined that the radius of a circular path described by these points during pivoting of the flaps is of equal size and an effective straight line connecting the points rotates about a center located approximately in the middle between the pivot axes.

A known flap arrangement with two oppositely pivoting flaps is arranged in an air-guide housing of an air-conditioning system. The two flaps are separated from one another by a partition wall mounted centrally between the flaps. The flaps can be pivoted continuously out of a closing position, in which they bear against horizontal flap stops and each separate an air-mixing space from a distributor space, into a maximum open position, with the pivoting directions of the flaps being opposite to one another. For reasons of space, the coupling linkage is arranged inside of the air-guide housing, thus making it necessary to provide in the partition wall an orifice which is preferably placed in the region of the distributor spaces located above the mixing spaces. To keep this orifice as small as possible, the pivoting geometry of the flaps is such that the end positions of each linkage articulation point on each flap, i.e. the point moving along a circular path when the flaps pivot, are located on a straight line extending perpendicularly relative to the partition wall when the flap is in its two end positions.

Such a known pivoting geometry, however, results in an error of synchronism between the flaps, so that, unequal quantities of air are fed into the two distributor spaces in a desired leakage-air or intermediate position of the flaps.

An object on which the present invention is based is to substantially improve a flap arrangement with oppositely moving flaps such that a synchronism of the flaps is ensured over the entire pivoting range; that is to say, the pivoting of the driven flap through a specific pivoting angle adjusts the respective coupled flap through a pivoting angle of the same amount.

In a flap arrangement according to the present invention, the foregoing object has been achieved by determining the articulation points on the flaps such that, on one hand, the radius of the circular path described by the points during pivoting of the flaps of equal size and, on the other hand, an effective straight line connecting the two articulation points rotates about a center of rotation located approximately midway between the pivot axes.

As a result of the arrangement of the linkage articulation points on the flaps in accordance with the present invention, the coupling linkage engages with the same lever arm on each flap in every adjustment position of the flaps. During the rotation or pivoting of the driven flap, this lever arm or effective spacing is increased or reduced uniformly on each flap and ensures a transmission ratio of 1:1, thereby guaranteeing the intended synchronism of the two flaps.

In a presently preferred embodiment of the invention, the coupling linkage is formed by a tripled angled portion rod which, when the flaps are in the maximum opening position, has its first angled portion located near the pivot axis of the coupled flap, its second, identically directed angled portion located approximately in the middle between the two pivot axes and its third angled portion directed oppositely to the other two angled portions and located approximately in the middle between the two pivot axes and its third angled portion is directed oppositely to the other two angled portions located approximately at the articulation point of the driven flap. The articulation point of the driven flap is arranged above its pivot axis, and the articulation point of the coupled flap is arranged below its pivot axis. Such a configuration makes it possible to accommodate the coupling linkage in a very confined space, and at the same time, the necessary perforation in a partition wall arranged between the flaps for guiding the rod through need be only of relatively small size.

According to a further embodiment of the present invention, the rod carries a threaded portion at its end facing the driven flap and is screwed in a rotary body. The rotary body rests by way of an annular flange in a vertical slot of an approximately horizontally arranged holding fork which is itself held rotatably by two laterally projecting pivot pins in bores of a flap shackle formed from two webs extending parallel to and at a distance from one another. This affords a possibility of adjusting the coupled flap, the relative position of which in relation to the driven flap can be adjusted over a wide range. At the same time, the synchronism of the flaps is ensured in all the adjustment positions.

In one embodiment of the present invention, the rotary body has a concentric internally threaded bore for screwing in the threaded portion of the rod. The bore is stepped in the mouth region pointing towards the third angling of the rod and has a larger bore diameter. This step allows a wider adjustment range, since in the final phase of adjustment, the third angled portion of the rod can penetrate into this step region, without impeding the adjusting movement of the rod in the rotary body.

BRIEF DESCRIPTION OF THE DRAWINGS

These and other objects, features and advantages of the present invention will become more apparent from the following detailed description of a presently preferred embodiment when taken in conjunction with the accompanying drawings wherein.

DETAILED DESCRIPTION OF THE DRAWINGS

Figure 1:
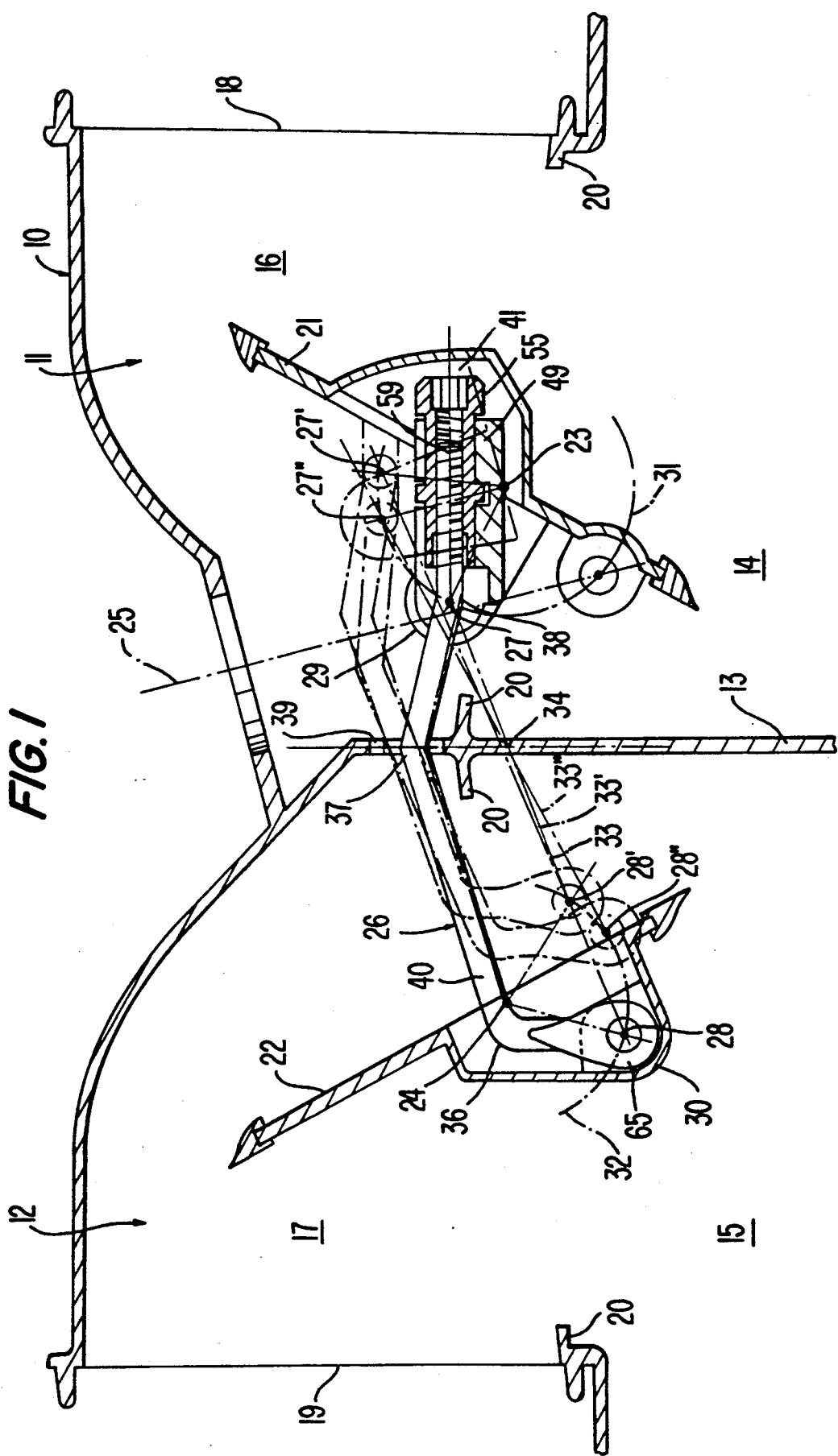
FIG. 1 is a longitudinal sectional side view through an air-guide housing with a flap arrangement according to the present invention incorporated therein.

In the cut-out portion of an air-guide housing 10 shown in FIG. 1, there are two separate air-guide ducts 11, 12 which make heating and cooling of airstreams independently of one another possible for the purpose of a right/left separation of the air-conditioning of the vehicle interior. The two air-guide ducts 11, 12 are separated from one another by a partition wall 13 and are each subdivided by a flap arrangement into a lower mixing space 14, 15, respectively, and an upper distributor space 16, 17, respectively. Each distributor space 16, 17 has a respective outlet orifice 18, 19 on the left and right side of the vehicle interior.

The flap arrangement has two flaps 21, 22, which, bear against horizontal flap stops 20 in their closing position and shut off the distributor spaces 16 and 17 from the mixing spaces 14 and 15, respectively. In their end opening position shown in FIG. 1, the flaps 21, 22 allow a maximum airstream to flow into the distributor spaces 16 and 17 from the respective mixing spaces 14 and 15. The flaps 21, 22 can be adjusted continuously between these two end positions, i.e. the end opening and closing positions, by rotatably mounting each flap laterally in the air-guide housing 10, so that they are pivotable about a pivot axis designated respectively by 23, 24 in FIG. 1. The two pivot axes 23, 24 are aligned parallel to one another.

Figure 8:
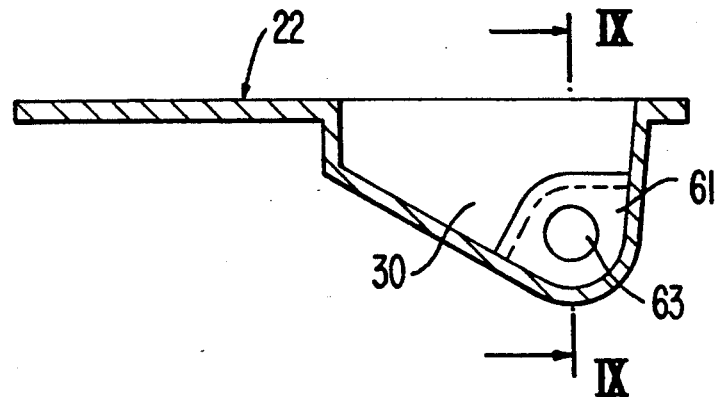
FIG. 8 is a longitudinal sectional view through the left-side flap shown in FIG. 1.

The right flap 21 is pivoted manually or by a drive motor via a lever 25 which is represented merely by a dot-and-dash line for the sake of clarity. The left flap 22 is coupled to the right flap 21 via a coupling linkage 26 such that the pivoting movement of the right flap 21 causes an oppositely directed pivoting movement of the other flap 22. The coupling linkage 26 is tied to the two flaps via articulation points 27, 28 on each flap 21, 22. The articulation point 27 on the right flap 21 is located above its pivot axis 23 on flap shackles 29 (FIG. 2), projecting from the flap 21; the articulation point 28 on the left flap 22 is located below its pivoting axis 24 in a flap pocket 30 (FIG. 8). To ensure that the pivoting angle of the two flaps 21, 22 is the same in all pivoting positions between the two end positions of the flaps 21, 22, the articulation points 27, 28 on the two flaps 21, 22 are so determined that, on the one hand, the radius of the described circular path 31, 32 (represented by broken lines in FIG. 1) during the pivoting of the flaps is equal and, on the other hand, during the pivoting of the flaps an imaginary effective straight line 33 (represented by broken lines in FIG. 1) connecting the two articulation points 27, 28, rotates about an imaginary center of rotation 34 located approximately in the middle between the pivot axes 23, 24, here in the partition wall 13.

FIG. 1 shows the position of the articulation points 27, 28 in three different pivoting positions of the flaps 21, 22. Thus, the position of the articulation points 27, 28 is designated by 27' and 28' in the closing position of the flaps 21, 22 and by 27" and 28" in a leakage-air or intermediate position of the flaps 21, 22. It can be seen clearly from FIG. 1 that the effective straight line 33, during the pivoting of the flaps 21, 22 into the two positions mentioned, in each of which it connects the articulation points 27' and 28' or 27" and 28", pivots about the center of rotation 34 and assumes its positions designated by 33' and 33". As a result of this determination of the articulation points 27, 28, the coupling linkage 26 has a transmission ratio of 1:1., so that the pivoting angles of the two flaps 21, 22 are always equal.

The coupling linkage 26 is guided through a perforation or aperture 39 provided in the partition wall 13, and located above the flap stops 20 between the distributor spaces 16, 17. To keep this perforation 39 as small as possible, the coupling linkage 26 takes the form of a three-angle coupling rod 40, the three-angled portions of which are such that in the maximum open position of the flaps 21, 22, as shown in FIG. 1, the first angled portion 36 is located near the pivot axis 24 of the coupled left flap 22, the second angled portion 37, which is directed identically to the first angled portion 36, is located approximately in the middle between the pivot axes 23, 24, that is to say directly in the perforation 39 here, and the third angled portion 38 directed oppositely to the other two angled portion 36, 37 is located approximately at the articulation point 27 of the driven right flap 21.

Figure 2:
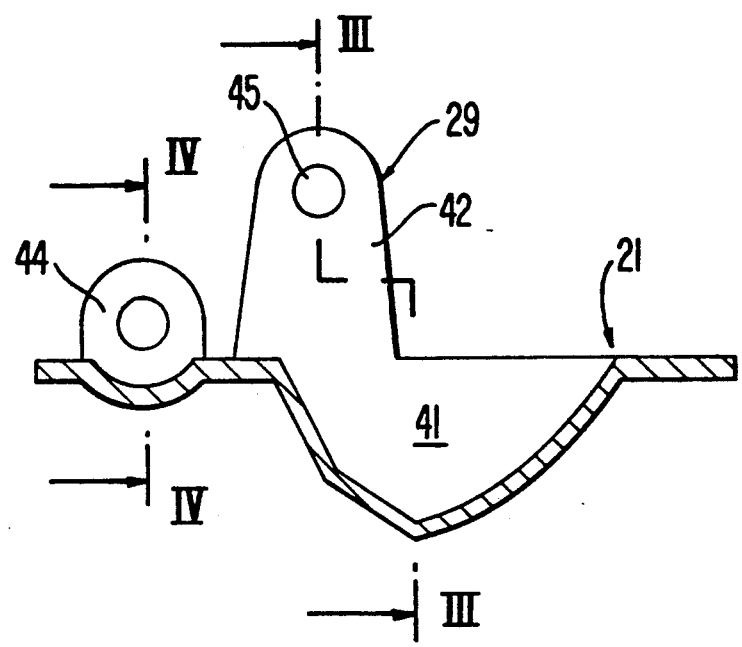
FIG. 2 is a longitudinal sectional front view through the right-side flap shown in FIG. 1.
Figure 3:
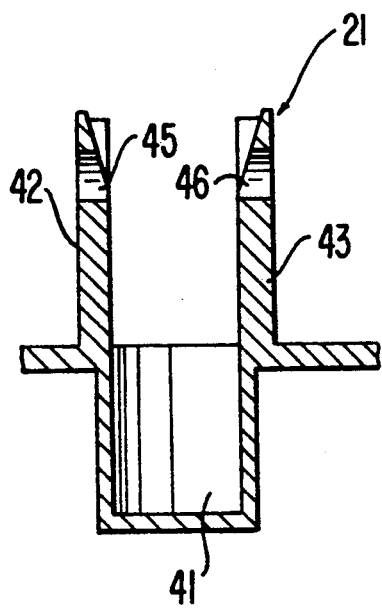
FIG. 3 is a sectional view along line III—III in FIG. 2.
Figure 4:
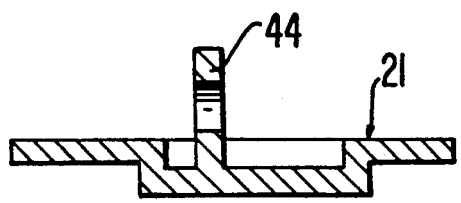
FIG. 4 is a sectional view along line IV—IV in FIG. 2.
Figure 5:
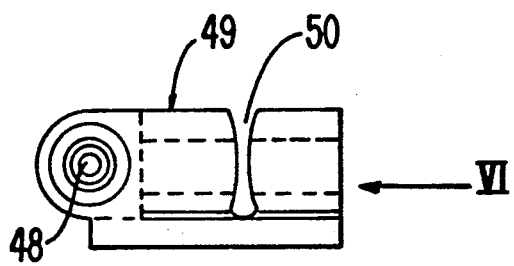
FIG. 5 is a side view of a holding fork on the right-side flap shown in FIG. 1.
Figure 6:
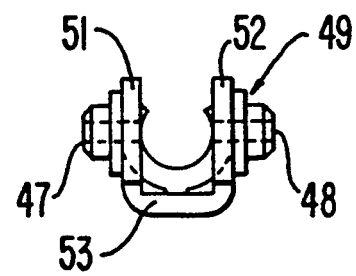
FIG. 6 is an elevational view of the holding fork in the direction of the arrow VI in FIG. 5.
Figure 7:
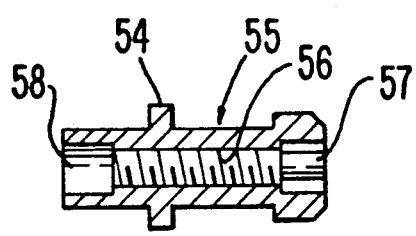
FIG. 7 is a longitudinal sectional view through a rotary body in the holding fork shown in FIG. 1.

The driven right flap 21 is shown in detail in FIGS. 2 to 4. The plate-shaped flap 21 has a recess 41 (FIG. 3) of U-shaped cross-section, in the region of which are located the upwardly projecting flap shackles 29 formed by two webs 42, 43 arranged parallel to and at a distance from one another. An articulation web 44 (FIG. 4) projects upwards from the flap 21 at a distance from the flap shackle 29, to which the lever 25 is fastened in an articulated manner. The two webs 42, 43 have coaxial bores 45, 46 into which pivot pins 47, 48 projecting laterally from a holding fork 49 engage. The holding fork 49 can be seen in detail in FIGS. 5 and 6. The holding fork 49 of approximately U-shaped cross-section carries approximately centrally a transverse slot 50 which passes through the two side walls 51, 52 of the holding fork 49 as far as the web 53. This transverse slot 50 serves for receiving an annular collar 54 of a rotary body 55, as shown in FIG. 7, which is inserted into the holding fork 49 and which rests with its annular collar 54 in a free-floating manner in the transverse slot 50. The rotary body 55 carries an internally threaded bore 56 which has a hexagon socket 57 adjoining it on one end face and a bore portion 58 of larger inside diameter adjoining it on the other side. The rotary body 55 is screwed onto an externally threaded portion 59 of the coupling rod 40 which is provided at the end of the coupling rod 35 pointing towards the right flap 21. The rotary body 55 is then inserted with its annular collar 34 into the holding fork 49 held rotatably on the flap shackles 29. The holding fork 49 is always maintained approximately horizontal by the coupling rod 40, so that the rotary body 55 cannot fall out of the holding fork 49.

Figure 9:
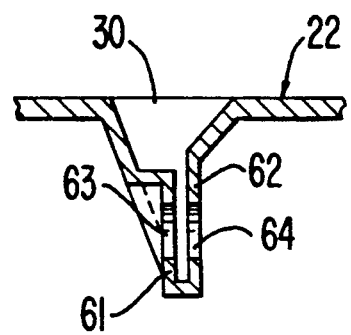
FIG. 9 is a sectional view along line IX—IX in FIG. 8, with a supplemented flap body.

The coupled left flap 22 can be seen in detail in FIGS. 8 and 9. The supplemented cross-section in FIG. 9 shows the configuration of the flap pocket 30 most clearly and as having two parallel walls 61, 62 which extend at a distance from one another and in which coaxial bores 63, 64 are provided. At its end intended for articulation on the left flap 22, the coupling rod 40 carries an eye 65 (FIG. 1) which penetrates between the two parallel walls 61, 62 of the flap pocket 30. A floating axle (not shown) passes through the bores 63, 65 and the eye 65, and articulatably connects the coupling rod 40 to the left flap 22.

The articulation of the right end of the coupling rod 40 on the driven right flap 21 by the holding fork 49 and rotary body 55 allows the positions of the two flaps 21, 22 to be adjusted relative to one another. To accomplish this adjustment, the driven left flap 22 is transferred into an end position, preferably into the closing position, in which it bears against the flap stop 20. If the right flap 21 has not then assumed the same position, for example, if it does not yet bear against the associated flap stop 20, by rotating the rotary body 55, the flap position of the right flap 21 can be varied until it assumes the same end position, that is to say likewise bears against the flap stop 20. The flap arrangement is thereby adjusted, and when the right flap 21 is adjusted via the lever 25, the left flap 22 is adjusted in the opposite direction through the same pivoting angle. As a result of the bore portion 58 of larger bore diameter adjoining the internally threaded bore 56, the third angled portion 38 on the coupling rod 40 can penetrate slightly into the rotary body 55 in the event of an extreme adjustment of the rotary body 55, without the coupling rod 40 and rotary body 55 being jammed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A flap arrangement for a ventilation and an airconditioning system of a vehicle, comprising two flaps pivotable about pivot axes parallel to one another, with a regulating member engaging on one flap for the flap adjustment, and with a linkage coupling the two flaps and connected to the flaps by articulation points such that a pivoting movement of the coupled flap, the articulation points on the flaps being determined such that the radii of the circular path described thereby during a pivoting of the flaps are equal, wherein the coupling linkage connecting the two flaps has a multi-angular configuration, and an imaginary straight line connecting the two articulation points during a pivoting of the flaps rotates about a center of rotation located approximately midway of the pivot axes and in an area of a wall physically separating the two flaps.

2. The flap arrangement according to claim 1, wherein the articulation point on one of the flaps is located above its associated one of the pivot axes on flap shackles projecting from the one flap, and the articulation point of the other of the flap is located below its associated one of the pivot axes in a flap pocket.

3. The flap arrangement according to claim 2, wherein the coupling linkage is formed by a triple-angled rod which, when the flaps are in the maximum open position, has its first angled portion located near the pivot axis of other flap, its identically detected second angled portion located approximately midway between the parallel pivot axes and its third angled portion directed oppositely to the other two angled portions located approximately at the articulation point of the one flap.

4. The flap arrangement according to claim 3, wherein the rod, at its end facing the one flap, has a threaded portion screwed into a rotary body which rests by way of an annular flange in a slot introduced from above of an approximately horizontally arranged holding fork is held rotatably by two laterally projecting pivot pins in bores of the flap shackles formed from two spaced webs extending parallel to one another.

5. The flap arrangement according to claim 4, wherein the rotary body has a concentric internally threaded bore stepped in a mouth region pointing towards the third angled portion of the rod for screwing in the threaded portion of the rod and also has a larger bore diameter.

6. The flap arrangement according to claim 3, wherein the rod, at its end facing the other flap, has an eye which penetrates between two parallel walls of the flap pocket on the flap and is held rotatably there at by a floating axle in bores in the walls.

7. The flap arrangement according to claim 6, wherein the rod, at its end facing the one flap, has a threaded portion screwed into a rotary body which rests by way of an annular flange in a slot introduced from above of an approximately horizontally arranged holding fork is held rotatably by two laterally projecting pivot pins in bores of the flap shackles formed from two spaced webs extending parallel to one another.

8. The flap arrangement according to claim 7, wherein the rotary body has a concentric internally threaded bore stepped in a mouth region pointing towards the third angled portion of the rod for screwing in the threaded portion of the rod and also has a larger bore diameter.

9. A method of adjusting quantities of air fed into separate distributor spaces of vehicle ventilation systems and air conditioning systems, comprising the steps of:

arranging articulation points of a driven flap and a coupled flap pivotable around parallel axes such that the radii of circular paths described by the articulation points during pivoting of the flaps are equal;

coupling the flaps at the articulation points with a linkage having a multi-angular configuration;

connecting the articulation points with an imaginary line whose center of rotation is located approximately midway between the parallel axes and in an area of a wall physically separating the two flaps, such that a pivoting movement of the driven flap causes an oppositely directed movement of the coupled flap.

* * * * *